W. B. ORIEL.
STEERING MEANS FOR VEHICLES.
APPLICATION FILED OCT. 16, 1919.
1,359,912.
Patented Nov. 23, 1920.
2 SHEETS—SHEET 1.
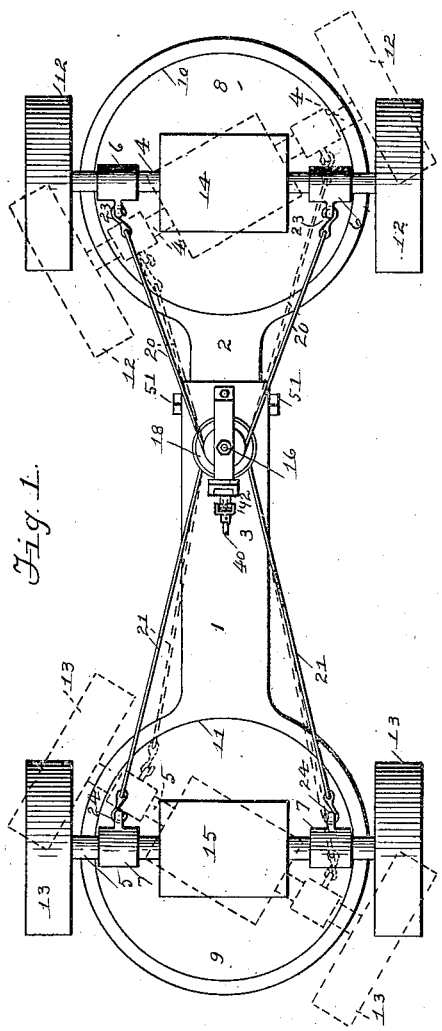
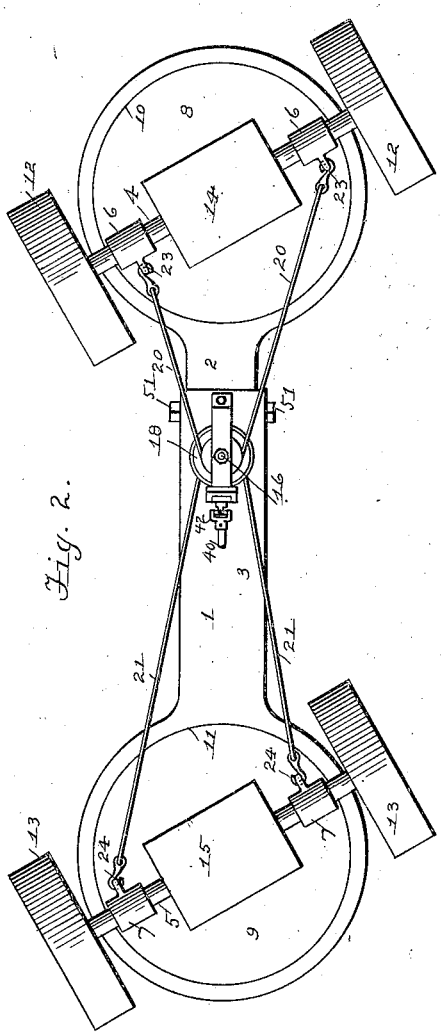
Inventor:
William Byron Oriel
By Cyrus W. Rice
Atty.
Witness:

W. B. ORIEL.
STEERING MEANS FOR VEHICLES.
APPLICATION FILED OCT. 16, 1919.
1,359,912.
Patented Nov. 23, 1920.
2 SHEETS—SHEET 2.
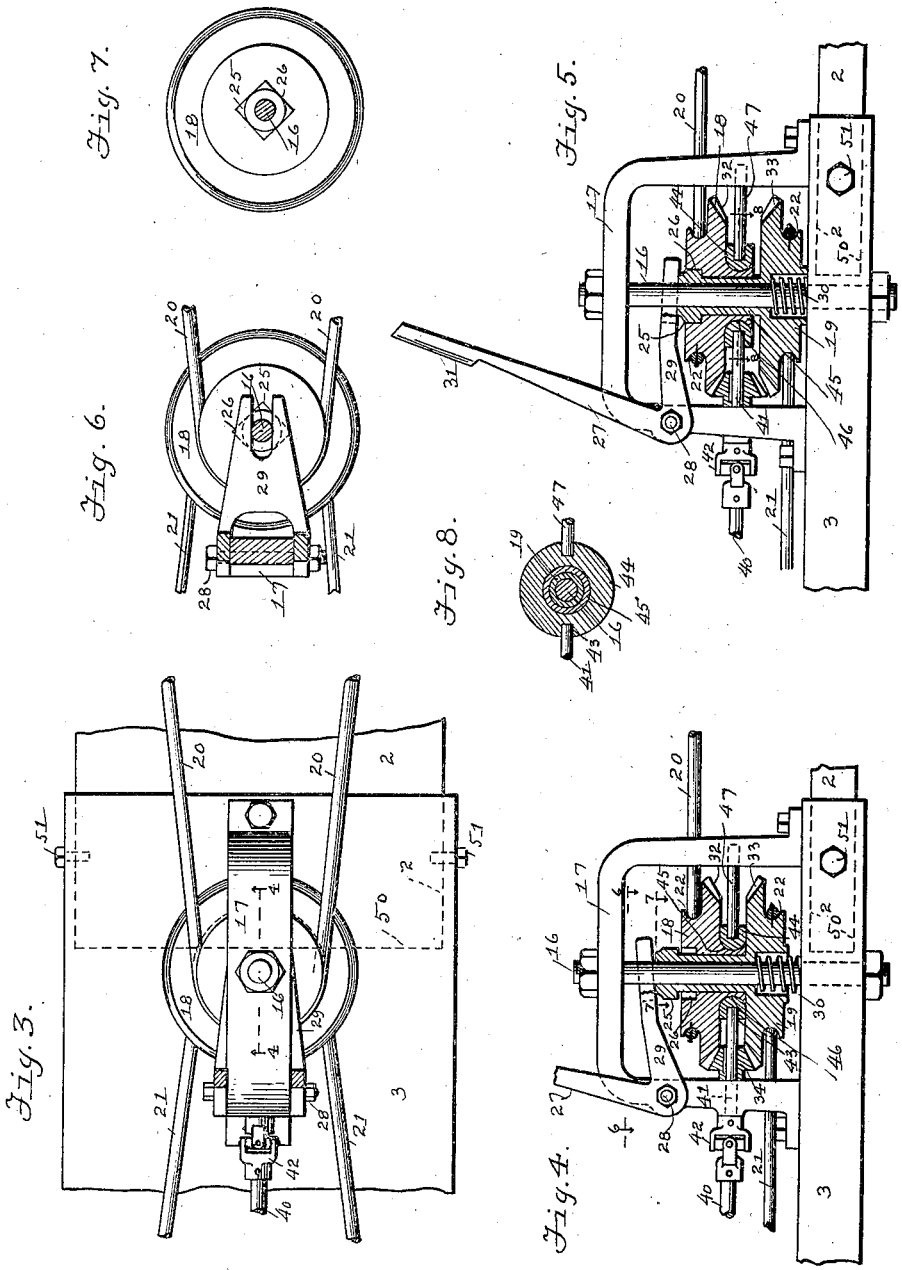
Witness:
Leo J. Dumas
Inventor:
William Byron Oriel
By Cyrus W. Rice
Atty.

UNITED STATES PATENT OFFICE.

WILLIAM BYRON ORIEL, OF GRAND RAPIDS, MICHIGAN.

STEERING MEANS FOR VEHICLES.

1,359,912.   Specification of Letters Patent.   Patented Nov. 23, 1920.

Application filed October 16, 1919. Serial No. 331,159.

*To all whom it may concern:*

Be it known that I, WILLIAM BYRON ORIEL, a citizen of the United States, residing at Grand Rapids, in the county of Kent and State of Michigan, have invented new and useful Improvements in Steering Means for Vehicles, of which the following is a specification.

The present invention relates to steering means for vehicles; and its general object is to provide improved means of that character; more particularly, an object is to provide improved means for steering the vehicle in a curve having a very short radius; a further object is to provide means for turning the axles parallelly so that the vehicle may approach a landing platform parallelly thereto; a further object is to provide means for steering the vehicle in a curve having a very short radius or for turning the axles parallelly as may be desired; and further and more particularly, an object is to provide simple and readily operable mechanism for effecting said objects.

These and any other objects hereinafter appearing are attained by, and the invention finds preferable embodiment in, the structure hereinafter particularly described and illustrated by the accompanying drawings, in which:

Figure 1 is a top plan view of a vehicle, showing in dotted lines the vehicle wheels and the axles on which they are mounted turned to steer the vehicle on a curve having a very short radius;

Fig. 2 is a like view of the same showing the axles turned parallelly;

Fig. 3 is a top plan view of certain parts of my steering means;

Fig. 4 is a side view of said parts some of which are shown in central or axial section taken on a plane corresponding to line 4—4 of Fig. 3: this figure illustrates the said parts in that position in which the vehicle is steered on a curve having a very short radius;

Fig. 5 is a like view, but illustrating the said parts in that position in which the axles are turned parallelly;

Fig. 6 is a view of certain parts, some of which are shown in horizontal section taken on a plane corresponding to line 6—6 of Fig. 4;

Fig. 7 is a view of certain parts, one of which is shown in horizontal section taken on a plane corresponding to line 7—7 of Fig. 4; and Fig. 8 is a view of certain parts in horizontal section taken on a plane corresponding to line 8—8 of Fig. 5.

In the embodiment of the invention chosen for illustration by the drawings and for detailed description in the body of this specification, my steering means is shown applied to a vehicle—the motor truck 1—having a frame comprising forward and rearward members 2 and 3. The two (front and rear) axles 4 and 5 of the vehicle are steerably-turnable relatively to the frame 1, being journaled at 6 and 7 on circular platforms 8 and 9 respectively, which platforms are turnable in bearings 10 and 11 on the frame. These axles, carrying the vehicle wheels 12, 12 and 13, 13 respectively may be driven to propel the vehicle by suitable means as the motors indicated at 14 and 15 carried by said platforms.

My steering means whereby the axles are steerably turned comprises the following parts: On a spindle 16, suitably supported as by the member 17 on the frame 1, are journaled the rotatable elements 18 and 19, suitable motion-transmitting connections, as the flexible connections or cable 20 extending between one element 18 and the front axle 4 and like connections 21 extending between the other element 19 and the rear axle 5. These connections may be of any suitable type or form, as the cords or cables wound on drum portions 22 of the elements 18 and 19 as shown, and pass therefrom to suitable points of connection 23, 24 with the axles or the turnable platforms 8, 9 on which said axles are journaled respectively. A clutch or coupling means is provided whereby these elements 18 and 19 may be coupled to turn together in the same direction (they forming when so coupled essentially a single turnable element), or may be uncoupled to permit them to turn in opposite directions. Such coupling means in the construction shown comprises a squared head 25 carried by a hub portion of the element 19 and adapted when the parts are in the position shown in Fig. 5 to couplingly engage in a correspondingly shaped socket 26 in the element 18; or to be disengaged therefrom when the parts are in the position shown in Fig. 4. To effect this coupling and uncoupling, the element 19 has an axial movement on the spindle 16, being pressed downwardly into coupling engagement by a suitable pedal 31 carried by the bell crank lever 27 pivoted at 28, whose bifurcated arm 29 straddles the spindle 16 and engages the upper end of the hub portion of the element 19 and moves said element downwardly against the pressure of a spring 30. These elements 18 and 19 have bevel gears 32, 33 on their adjacent sides with both of which gears the rotatable gear member 34 meshes when the parts are in the position shown in Fig. 4, in which position the rotation of this member 34 turns said elements in opposite directions whereby the axles are inclined relatively to each other, in the position seen in dotted lines in Fig. 1, thus steering the vehicle on a curve with a very short radius: but when the parts are in the position shown in Fig. 5, the gear member 34 meshes with the gear 32 of the element 18 only, and turns it and the element 19 (now coupled therewith) in the same direction, whereby the axles are turned parallelly in the position shown in Fig. 2, thus steering the vehicle so that it may approach a loading platform and the like parallelly. The gear member 34 may be rotated by a suitable steering wheel (not shown) on a steering shaft 40 connected to the shaft 41 of the gear member 34 by a universal joint 42. This shaft 41 may extend inwardly and may be journaled at 43 in an annular member 44 surrounding a hub portion 45 of the element 18 and seated in an annular groove 46 therein; and a suitable pin 47 carried by the supporting member 17 may be employed to engage the opposite side of the annular member 44 to securely hold said member in position. The two members 2 and 3 of the frame 1 may be detachably connected by means of a socket 50 in member 3 in which the rear end of member 2 may be seated and held by set screws 51.

The invention being intended to be pointed out in the claims is not to be limited to or by details of construction of the particular embodiment thereof illustrated or hereinbefore described.

I claim:

1. In a vehicle; front and rear steerably-turnable axles carrying vehicle wheels at their opposite ends; a turnable element; connections between said element and one axle to turn said axle by the turning of said element; a second turnable element; connections between said second element and the second axle to turn the second axle by the turning of said second element; coupling and uncoupling means intermediate said elements; a rotatable member adapted to turnably engage at its opposite sides both said elements to turn the same in their uncoupled position in opposite directions and to engage only one of said elements to turn both said elements in their coupled position in the same direction.

2. In a vehicle; front and rear steerably-turnable axles; a turnable element having a gear; connections between said element and one axle to turn said axle by the turning of said element; a second turnable element having a gear; connections between said second element and the second axle to turn the second axle by the turning of said second element; one of said elements having an axial movement into and out of coupling engagement with the other of said elements; a rotatable gear meshing at its opposite sides with the gears of said elements to turn the same in their uncoupled position in opposite directions and meshing with only one of said elements to turn both said elements in their coupled position in the same direction.

3. In a vehicle; front and rear steerably-turnable axles; co-axial turnable elements having gears; connections between one of said elements and one axle to turn said axle by the turning of said element; a second turnable element having a gear; connections between said second element and the second axle to turn the second axle by the turning of said second element; each of said elements having one of coöperating coupling members, and one of said elements having an axial movement whereby said coupling members are brought into and out of coupling engagement; means for moving said axially movable element into one such position; a spring urging said axially movable element out of such position; a rotatable gear meshing at its opposite sides with the gears of said elements to turn the same in their uncoupled position in opposite directions and engaging only one of said elements to turn both said elements in their coupled position in the same direction.

In testimony whereof I have hereunto set my hand at Grand Rapids, Michigan, this 14th day of October, 1919.

WILLIAM BYRON ORIEL.